US010753127B2

United States Patent
Gabriel et al.

(10) Patent No.: US 10,753,127 B2
(45) Date of Patent: Aug. 25, 2020

(54) DOOR HANDLE MODULE

(71) Applicant: Huf Hülsbeck & Fürst GmbH & Co. KG, Velbert (DE)

(72) Inventors: Lars Gabriel, Velbert (DE); Andreas Peschl, Velbert (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 0 days.

(21) Appl. No.: 16/056,572

(22) Filed: Aug. 7, 2018

(65) Prior Publication Data
US 2019/0040660 A1    Feb. 7, 2019

(30) Foreign Application Priority Data
Aug. 7, 2017   (DE) .................... 10 2017 117 926

(51) Int. Cl.
| E05B 81/78 | (2014.01) |
| B60R 16/023 | (2006.01) |
| B60R 25/01 | (2013.01) |
| G07C 9/00 | (2020.01) |
| E05B 79/06 | (2014.01) |
| E05B 85/10 | (2014.01) |

(52) U.S. Cl.
CPC ............ *E05B 81/78* (2013.01); *B60R 16/023* (2013.01); *B60R 25/01* (2013.01); *G07C 9/00309* (2013.01); *E05B 79/06* (2013.01); *E05B 85/10* (2013.01)

(58) Field of Classification Search
None
See application file for complete search history.

(56) References Cited

U.S. PATENT DOCUMENTS

| 6,577,228 B1* | 6/2003 | Tsuchida ................ B60R 25/24 340/10.1 |
| 6,768,413 B1 | 7/2004 | Kemmann et al. |
| 7,422,258 B2* | 9/2008 | Schindler .......... B29C 45/14639 296/1.02 |
| 7,598,469 B2* | 10/2009 | Tanimoto ................ B60R 25/00 200/341 |

(Continued)

FOREIGN PATENT DOCUMENTS

| DE | 10018931 | 1/2001 |
| DE | 19943989 | 4/2001 |

(Continued)

OTHER PUBLICATIONS

Europäischer Recherchenbericht und die Stellungnahme zur Europäischen Recherche [European Search Report and the European Search Opinion] dated Jan. 8, 2019 From the European Patent Office Re. Application No. 18187266.4 and Its Summary of the Search Opinion in English. (8 Pages).

*Primary Examiner* — Carlos Garcia

(57) ABSTRACT

The invention relates to a door handle module (100) for a handle device (202) of a moveable part (201) of a vehicle (200), in particular a commercial vehicle, comprising: a housing (10), in which a receptacle (11) is formed, in which an electronics unit (12) for controlling a security system (203) of the vehicle (200) is arranged, wherein the electronics unit (12) comprises at least one communication element (12a, 12b) for the exchange of data with the vehicle-external communication unit (50).

20 Claims, 13 Drawing Sheets

(56) References Cited

U.S. PATENT DOCUMENTS

| | | | |
|---|---|---|---|
| 7,984,938 B2 * | 7/2011 | Tanimoto | E05B 81/78 |
| | | | 292/336.3 |
| 2003/0001729 A1 * | 1/2003 | Ieda | B60R 25/246 |
| | | | 340/426.1 |
| 2007/0182166 A1 * | 8/2007 | Schindler | E05B 81/78 |
| | | | 292/336.3 |
| 2018/0312137 A1 * | 11/2018 | Neuhoff | E05B 81/78 |
| 2019/0169888 A1 * | 6/2019 | Gabriel | E05B 79/02 |

FOREIGN PATENT DOCUMENTS

| | | |
|---|---|---|
| DE | 102006025075 | 12/2007 |
| DE | 102017123065 | 5/2018 |
| EP | 2458119 | 5/2012 |
| GB | 2180415 | 3/1987 |
| WO | WO 2008/137634 | 11/2008 |

* cited by examiner

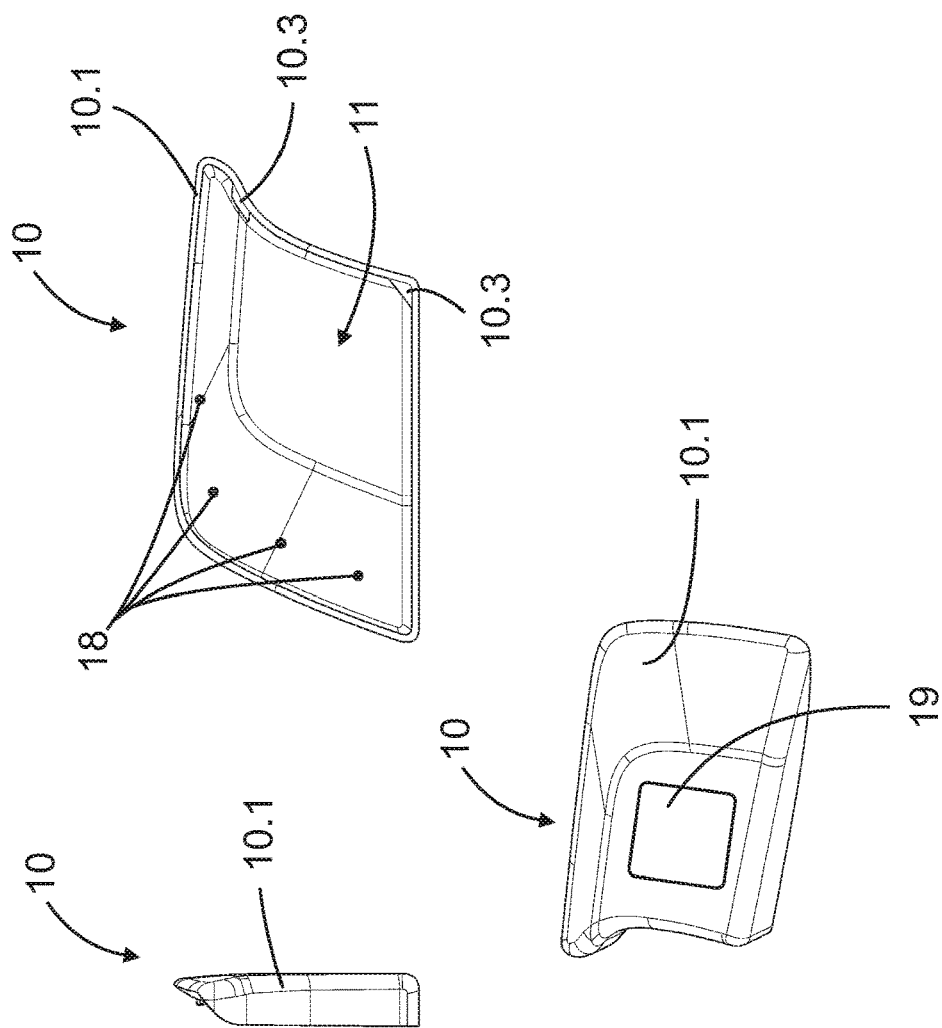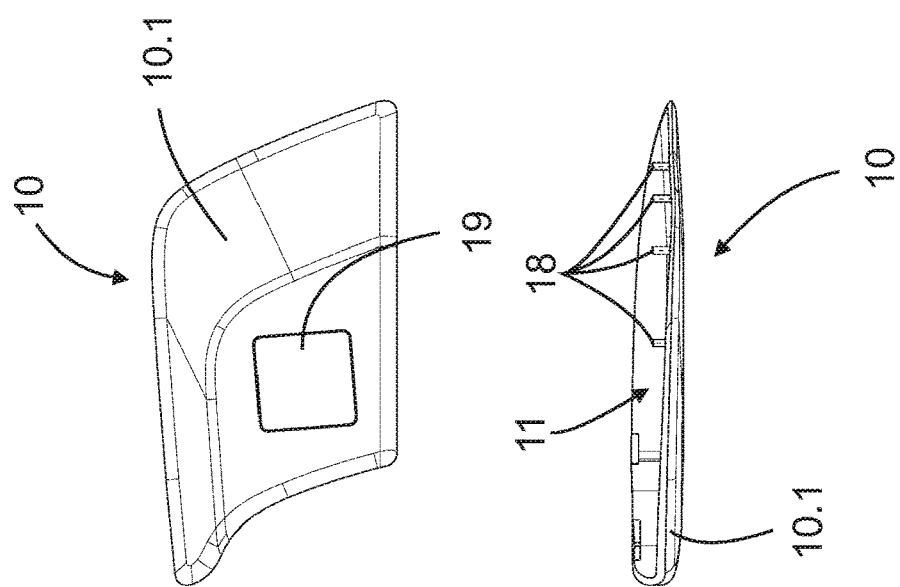
Fig. 3

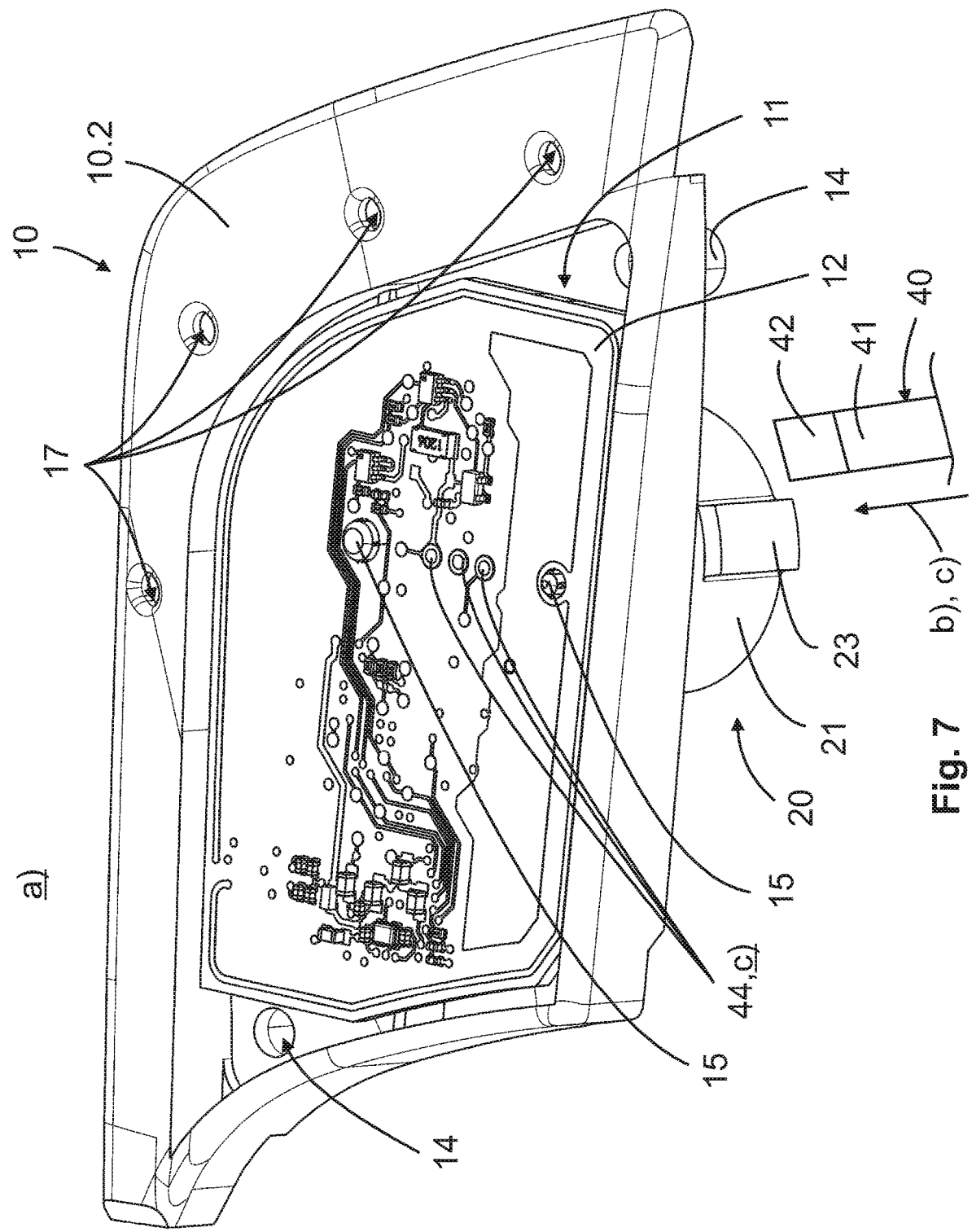

DOOR HANDLE MODULE

RELATED APPLICATION

This application claims the benefit of priority of German Patent Application No. 10 2017 117 926.7 filed Aug. 7, 2017, the contents of which are incorporated herein by reference in their entirety.

FIELD AND BACKGROUND OF THE INVENTION

The present invention relates to a door handle module for a handle device of a movable part, e.g. a door or a flap, of a vehicle, in particular a commercial vehicle, according to the independent device claim, to a method for mounting a door handle module on a handle device according to the corresponding independent method claim, to a method for producing a door handle module for a handle device according to the corresponding independent method claim, as well as to a method for providing a door handle module for a handle device according to the corresponding independent method claim.

Handle devices for vehicles may eventually have a very long period of series production, so that corresponding models of the handle devices are employed over a long period of time, in particular on commercial vehicles. Functionalities of modern handle devices can be missing in such handle devices, for example due to missing electronic functions, since the product service life is correspondingly longer in vehicles with a long period of employ, and the scope of functions of already installed handles may be limited. An upgrade with electronics units to conventional handle devices involves major mounting efforts and extensive reconstruction of the handle devices. In addition, retrofit electronics units are exposed to environmental influences and may thus have defects in functioning.

Thus, it is an object of the invention to at least partially remove the above drawbacks known from the prior art. In particular, the object of the present invention is to provide an extended scope of functions for existing handle devices on vehicles, in particular commercial vehicles, and preferably improve convenience and/or security in security systems, in particular in access control systems of the vehicles afterwards. Furthermore, it is an optional object of the present invention to provide a door handle module for a handle device of a moveable part such as a door or a flap, of a vehicle, in particular a commercial vehicle, which is simple and cost-effective in production, which can be mounted on a handle device in a simple manner and without extensive mounting efforts, which is formed to be weather-resistant, reliable in operation and has a long service life. In addition, it is preferably an object of the invention to provide a method for mounting such a door handle module on a handle device, a method for producing such a door handle module for a handle device, and a method for providing a corresponding door handle module for a handle device.

SUMMARY OF THE INVENTION

The above object is achieved by means of a door handle module having the features of the first independent device claim, a method for mounting a door handle module on a handle device having the features of the corresponding independent method claim, a method for producing a door handle module for a handle device having the features of the corresponding independent method claim as well as by a method for providing a door handle module for a handle device having the features of the corresponding independent method claim.

Further features and details of the invention result from the sub-claims, the description and the drawings. Features and details that have been described in conjunction with the door handle module according to the invention naturally also apply in conjunction with the method according to the invention and vice versa, so that reference is or can be mutually made to the individual aspects of the invention in regard to the disclosure.

The invention provides a door handle module for a handle device of a moveable part, such as a door or a flap, of a vehicle, in particular a commercial vehicle or utility vehicle, comprising: a housing, in which an in particular closed, preferably sealed, receptacle is formed, in which an electronics unit for controlling a security system of the vehicle is arranged, wherein the electronics unit comprises at least one communication element for exchanging data with a vehicle-external communication unit.

In the scope of the invention, the electronics unit serves to provide a wireless communication capability with a vehicle-external communication unit on the handle device of the moveable part of the vehicle. The electronics unit can receive data, such as identification data, from the vehicle-external communication unit, such as a mobile radio device, a laptop and/or an ID transponder, which the electronic device can forward to the security system, e.g. in the form of an access control system, e.g. for verification. Forwarding the data from the electronics unit to the security system can, in turn, occur through a cable. After a successful data exchange between the vehicle-external communication unit and the vehicle-side security system, for example for identification or authorization request, the electronics unit can cause, e.g. via the security system of the vehicle, an actuation of a lock of the moveable part, in order to unlock the moveable part, whereby the moveable part is unblocked for opening by means of the handle device. Thus, the door handle module according to the invention can enable a remote controlling of the security system. Thereby, convenience when operating the security system can be adapted to modern requirements and thus be improved. In this way, drivers of the vehicle can be put into the position afterwards (by the reconfiguration) by means of the use of the invention to open the vehicle with their mobile radio device (in particular exclusively) and, as the case may be, to start it. It is conceivable to that end, that corresponding access data (e.g. from a shipping company) for the vehicle are sent to the driver wirelessly, with which the driver can operate and drive the vehicle. In addition, the security in the operation of the security system can be improved by means of the door handle module according to the invention.

Furthermore, it is conceivable in the scope of the invention that the electronics unit may serve for the storing of travelling data, e.g. a driver's log, user profiles or wear-related vehicle data, in order to extend the existing functions in the vehicle.

The door handle module according to the invention can, preferably, be mounted in an already existing and/or technically available handle device of a vehicle, in particular of a commercial vehicle, e.g. in the meaning of a retrofit in old vehicles or an additional equipment in new vehicles. The door handle module according to the invention, in particular the electronics unit, can bring along the required hardware for a remote control of the security system. Moreover, the door handle module according to the invention, in particular the electronics unit, can provide the required software, in order to enable a remote control system in the type of a keyless-go or keyless-enter system. The door handle module with the electronics unit can advantageously be connected to the existing vehicle electronics or to the existing control system of the vehicle electronics, in order to be able to control an existing central locking mechanism and an existing security system.

The new functions are advantageously provided while the geometric and aerodynamic design of the handle device is maintained. The door handle module according to the invention can be adapted to the existing handle device of the vehicle in terms of design and haptics, in order to not affect the appearance of the handle device. The door handle module can, for example, be mounted on a module receptacle of the handle device. The module receptacle can be an already existing receptacle on the handle device, e.g. a locking cylinder receptacle, or a receptacle to be produced especially to that end, e.g. in the form of a bore. The receptacle can be provided on a handle, a handle recess or an external recess of the handle device, or on a part of the vehicle body on which the handle device is arranged. In addition, it is conceivable that the door handle module can be fastened to the module receptacle of the handle device in a force-fit and/or form-fit manner. Furthermore, a housing made of plastics can be provided for the door handle module, e.g. of polyamide, preferably polyamide 6, or glass fiber reinforced plastics. The visible side of the housing can be painted, coated or colored in order to adapt the optical appearance to the vehicle, or to the handle device, respectively. The door handle module can preferably be arranged on the handle device at least sectionally in a flush-mounted manner. Thus, an aesthetic design of the handle device can be achieved. Moreover, the risk of getting injured on the door handle module can be reduced.

The inventive idea is that the housing according to the invention encloses the electronics unit, in particular that a preferably enclosed and preferably sealed receptacle for the electronics unit is provided by the housing according to the invention, in which the electronics unit can be reliably and permanently be protected against external influence such as moisture and/or dirt. The door handle module according to the invention is provided as a preferably completely enclosed and sealed retrofit part, which can be mounted on the handle device in a simple, convenient manner and without extensive mounting efforts. It is conceivable in the scope of the invention that the door handle module is provided as a very flat module. A fastening of the door handle module according to the invention can be effected by means of an original shank of a mechanical locking cylinder of the handle device. It is also possible that a connection element, e.g. in the form of a cable, for the electric connection of the electronics unit to the security system of the vehicle be guided through this shaft. The door handle module itself can be fastened to the handle device via a bayonet mount with a special fastening adapter. In this case, the door handle module can be placed on the mounting receptacle from outside, and the fastening adapter can be placed on the mounting receptacle from the inside, in order to be connected to one another. The fastening of the door handle module to the handle device can be ensured by this connection. The fastening adapter can be screwed to the handle device on the internal side, and guide-through the connection element or the cable for the electronics unit. It is conceivable that the fastening adapter has special clamping or strain-relief elements for the cable. The housing of the door handle module can preferably be built in two parts to enable the flat design of the housing, in which the electronics unit can be arranged in a manner to be completely surrounded by the housing. The housing has a nice look on the one hand, and on the other hand, the housing is closed-off in itself, in order to accommodate the electronics unit in a protected and secure manner. The two housing parts can be connected to one another in a form-fit and/or force-fit manner and preferably be sealed. In addition, the housing parts can be bonded. In order to protect the electronics unit against moisture, the receptacle in the housing can be filled with a potting material, which is why two filling spouts can be provided on the rear side on the housing lower part, which can also serve for the centering of the door handle module on the handle device at the same time.

Thus, using the door handle module according to the invention, a retrofit part is provided, in order to enable an extended scope of functions for existing handle devices on vehicles, in particular commercial vehicles. Furthermore, using the door handle module according to the invention, the comfort and/or security in security systems is improved, in particular in access control systems of the vehicles. The door handle module according to the invention advantageously is a simple and cost-efficient component, which can be mounted on a handle device in a simple manner and without extensive mounting efforts, which is formed to be weather-resistant and reliable in operation and has a long service life.

Furthermore, in the case of a door handle module, the invention may provide that the electronics unit comprises at least one communication element in the form of a sensor element, in particular of a capacitive sensor element, in order to wake the electronics unit. Thus, the electronics unit can be operated in an energy-saving manner. The sensor element can detect a user in the surroundings of the door handle module and only then turn-on the electronics unit, e.g. for an authorization request. A sensor element in the form of a capacitive sensor element advantageously is a simple and energy-saving component, which can be operated even without energy supply.

Furthermore, in the case of a door handle module, the invention may provide that that the electronics unit comprises at least one communication element in the form of a wireless communication element, in particular an NFC, Bluetooth, Infrared, GSM, LTE, UMTS, mobile radio, HF, UHF, LF and/or WLAN communication element, to ensure communication of the security system of the vehicle and the vehicle-external communication unit. A wireless communication element can improve the comfort in the operation of the security system of the vehicle. A communication element in the form of an NFC element is advantageous because it can enable communication across defined, limited distances. This can significantly increase the security in communication with the vehicle-external communication unit.

Furthermore, in the case of a door handle module, the invention may provide that the housing is formed in one piece or in two pieces with a first housing part, which serves at least for covering the receptacle or for visible arrangement on the handle device, and with a second housing part, which serves at least for fastening the electronics unit or for establishing a connection of the connection element with the fastening adapter. A one-piece housing can be advantageous to simplify the production of the door handle module. A two-part housing is advantageous to provide a mostly flat door handle module, in which the electronics unit can be accommodated in a simple and comfortable manner.

Moreover, it is conceivable that the housing, in particular in a second housing part, may comprises at least one, preferably two receiving pins, in order to fasten the electronics unit to the housing, in particular by staking. Thus, the electronics unit can be brought into a position on the housing defined by the receiving pins in a simple and convenient manner. Furthermore, the housing pins can include radially projecting spacers on the base of the housing pins, in order to keep the electronics unit at a certain distance from the housing. The spacers can advantageously serve as reinforcement rips for the door handle module and also enable for potting or casting around the electronics unit from both sides with a potting material inside the housing. The electronics unit can thereby advantageously be sealed from all sides in a reliable manner and, moreover, be protected from mechanical impacts.

Furthermore, in the case of a door handle module, the invention may provide that the housing, in particular on a second housing part, comprises a connection aperture for a connection element, preferably for a first plug of the connection element for connection to the electronics unit. Thus, an electric and data-technical connection of the electronics unit can be provided after the attachment to the housing. Advantageously, the connection aperture can be formed in a manner complementary to the first plug, so that the plug can be supported in a predefined position on the electronics unit and be soldered there.

Furthermore, in the case of a door handle module, the invention may provide that the housing, in particular on a second housing part, comprises at least one, preferably two filling spouts, in order to fill at least the receptacle with a potting material, or to position the housing on an external side of the handle device. By means of the filling spouts, the receptacle can be filled with the potting material around the electronics unit. In order to achieve an improved adherence of the potting material to at least one inner surface of the housing, this housing can be roughened at least mechanically or chemically. Furthermore, the same filling spouts can be used to position the door handle module on the handle device. As a result, a reliably sealed and easily modifiable door handle module can be provided.

Furthermore, in the case of a door handle module, the invention may provide that the housing, in particular on a second housing part, comprises at least one, preferably multiple connection openings, preferably arranged on one side, which cooperate with connection pins on a first housing part in order to attach the first housing part to the second housing part, in particular by staking. As a result, a reliable, preferably non-releasable connection between the first and second housing part can be created in a simple and advantageous manner. In connection openings which are arranged on one side or which are arranged in an unsymmetrical manner, it can be advantageous that the orientation of the first housing part in relation to the second housing part can be provided, under which the housing parts can be connected together. Thus, the assembly of the door handle module can be made in an intuitive and less error prone manner.

In addition, it is conceivable that the housing can comprise, in particular on a first housing part, an actuation section in order to point out to at least one communication element of the electronics unit in an optical and/or tactile manner. This actuation section can be present on a surface of the first housing part by impressing/imprinting or forming, wherein only the edge of the actuation section can be marked accordingly. Thus, the operation of the door handle module can be facilitated and the user can be guided to a correct position of the communication element, in order to initiate a data communication with the electronics unit.

Moreover, in the case of a door handle module, the invention may provide that the housing, in particular on a first housing part, comprises at least one, preferably multiple undercuts, which are preferably arranged on one side, in order to position the first housing part on the second housing part. The second housing part can thus be clamped under the undercuts for closing the receptacle, preferably on one side, and then be lowered or pivoted downward to the first housing part. Thus, the undercuts allow a simple assembly of the door handle module, in which every step is intuitively predetermined by the elements of the door handle module.

Furthermore, the invention can provide that a connection element, in particular in the form of a cable with a first plug, in particular in the form of a Molex© plug, for connecting to the electronics unit, and a second plug for connecting to the security system of the vehicle, is provided. Advantageously, energy and/or data can be transmitted via the connection element between the electronics unit and the vehicle-side security system. The cable can, for example, be formed in the type of a data bus, in order to enable communication and/or a data exchange between the electronics unit and the vehicle-side security system.

Furthermore, in the case of a door handle module, the invention may provide that a connection element, in particular on a second plug, comprises a clip guidance, to fix the connection element on the vehicle, preferably in a mounting clip of the vehicle which is configured in a complementary manner, and/or that at least one guidance clip for a connection element, in particular for a cable of the connection element, is provided, in order to position the connection element, preferably the cable of the connection element, on the vehicle. The clip guidance and the mounting clip can be arranged in the vicinity of the security system. One or multiple guidance clips can be used along the cable, as required. As a result, the invention can provide a complete construction set, by means of which not only the door handle module can be fastened to the handle device, but also the connection element can be installed on the vehicle in a simple and convenient manner and be guided all the way to the security system.

Furthermore, in the case of a door handle module, the invention may provide that a, in particular separate, fastening adapter is provided for insertion from an internal side of the handle device. Using the fastening adapter, a closed housing of the door handle module can be arranged from an external side of the handle device, wherein only the fastening adapter must be arranged from an internal side of the handle device for the attachment of the door handle module.

In addition, in the case of a door handle module, the invention may provide that a connection element is provided for the insertion from an external side of the handle device, which can be formed in particular of the same material as and/or monolithically with the housing. Thus, a complementary element adapted to the fastening can be provided, in order to establish a connection between the housing and the fastening adapter. Between that, an external recess of the handle recess or of the external recess of the handle device can extend, which can be jammed between the fastening adapter and the housing of the door handle module.

Furthermore, it is conceivable within the scope of the invention that the door handle module can be fastened to the handle device via a connection of a housing-side connection element to a preferably separate fastening adapter. This achieves the advantage that no interaction of the door handle module according to the invention with the handle recess or the external recess of the handle device is required to accommodate the electronics unit in a protected manner. Rather, an already closed or sealed housing of the door handle module can be fastened to the handle device. To that end, the door handle module can be inserted on a mounting receptacle of the handle device, e.g. a locking cylinder receptacle, preferably in place of the locking cylinder, and be fastened from the inside with the fastening adapter. Advantageously, the fastening adapter and the connection element can at least sectionally be formed in the shape of a cylinder and be inserted coaxially with one another, in order to likewise coaxially be inserted through a module receptacle of the handle device.

Furthermore, the invention can provide that a, preferably separate, fastening adapter for establishing at least one form-fit and/or force-fit connection, a plug-rotation connection, a bayonet mount, a screw connection or a latch connection, with a housing-side connection element is formed. As a result, a simple and fast mounting of the door handle module on the handle device can be enabled.

Furthermore, it is conceivable that a preferably separate fastening adapter has an at least sectionally cylindrical guidance section, which can be received in a module receptacle, preferably in a locking cylinder receptacle, of the handle device, and/or that a, preferably separate, fastening adapter is formed geometrically complementary to a module receptacle, in particular to a locking cylinder receptacle, of the locking device. Advantageously, an already existing module receptacle on the handle device can be used thereby, in order to fasten the door handle module thereto. Thus, the existing handle device does not have to be reconstructed, and the upgrade of the handle device can be effected in a cost-efficient manner and with little effort.

Furthermore, in the case of a door handle module, the invention may provide that a preferably separate fastening adapter, in particular inside a guidance section, comprises an essentially annular receiving element, which is formed in such a way as to allow a connection of a housing-side connection element to the fastening adapter in only one predefined orientation of the connection element relative to the fastening adapter. Thus, the correctness of the mounting can be ensured, and the technician can receive a haptic feedback thereby.

In addition, it is possible that a, preferably separate, fastening adapter, in particular on a receiving element, comprises at least one, preferably groove-shaped, receiving means for a preferably cam-shaped positioning means on a housing-side connection element. When the positioning means engage into the receiving means, the connection element can be plugged into the fastening adapter. As a result, the connection of a housing-side connection element to the fastening adapter can be enabled on only one predefined orientation of the connection element relative to the fastening adapter.

Moreover, in the scope of the invention, a preferably separate fastening adapter may comprise at least one fastening arm, which protrudes in particular externally on a guidance section, in order to fasten the fastening adapter on the handle device in a form- and/or force-fit manner, and/or that a preferably separate fastening adapter, in particular on a fastening arm, comprises a fastening means, preferably in the form of a receiving opening for a screw or in the form of a latch element for a complementary counter-latch element of the handle device. Thus, the fastening adapter can be fastened from the internal side of the handle device in a simple and convenient manner, whereby the door handle module is attached to the handle device in a captive manner.

Furthermore, in the scope of a door handle module according to the invention, a preferably separate fastening adapter can comprise at least one strain-relief element, which in particular protrudes externally in a guidance section, for a connection element, in particular for a cable of the connection element. Thus, the connection element can be connected to the electronics unit in a reliable manner, without posing the future risk that tensile forces are transmitted to the connection points to the electronics unit and the connection between the connection element and the electronics unit is interrupted or released.

Furthermore, in the case of a door handle module, the invention may provide that a housing-side connection element comprises a, in particular at least sectionally cylindrical, guidance body, which can be received in a fastening adapter, in particular within a guidance section, and/or that a housing-side connection element is formed geometrically complementary to a preferably separate fastening adapter. Thus, a simple and fast mounting of the door handle module on the handle device can be enabled.

Furthermore, in the case of a door handle module, the invention may provide that a housing-side connection element comprises, in particular externally, at least one preferably cam-shaped positioning means, which can be brought into a mechanical engagement with a groove-shaped receiving means on a preferably separate fastening adapter, in order to enable the connection of the connection element to the fastening adapter in only one predefined orientation of the connection element relative to the fastening adapter. Thus, a plugging of the connection element into the fastening adapter can be enabled. Furthermore, a turning of the fastening adapter relative to the connection element can be enabled thereby, in order to create a plug-rotation-connection between the connection element and the fastening adapter.

Furthermore, the object according to the invention is achieved by means of a method for mounting a door handle module on a handle device of a moveable part of a vehicle, in particular of a commercial vehicle, wherein the door handle module is configured to exchange data with a vehicle-external communication unit and to control a security system of the vehicle, in particular as described above, wherein a housing of the door handle module is fixed to an external side of the handle device and fastened to the handle device by means of a fastening adapter from an internal side of the handle device. Thus, an already closed and sealed housing can be positioned on the exterior side of the handle device, in which the electronics unit can be accommodated in a manner to be protected from environmental influences and mechanical impacts. For the fastening of the housing of the door handle module, only the fastening adapter is to be positioned from the internal side of the handle device and be fastened to the housing of the door handle module. As a result, a simple and fast mounting of the door handle module on the handle device can be enabled. Moreover, the same advantages as have been described above in conjunction with the door handle module according to the invention are achieved by means of the method according to the invention for mounting the door handle module on the handle device. Reference is fully made to these advantages here.

Furthermore, the invention can provide in a method for mounting the door handle module on the handle device that the door handle module is being fastened to the handle device by creating a form-fit and/or force-fit connection, in particular a plug-rotation connection, preferably a bayonet mount, screw lock or latch lock of a connection element of the housing, which is formed in particular of the same material as and/or monolithically with the housing, to the fastening adapter. The mounting of the door handle module on the handle device can thus be effected in a simple manner and in only a few steps.

Furthermore, the object according to the invention is achieved by means of a method for producing a door handle module for a handle device of a moveable part of a vehicle, in particular a commercial vehicle, wherein the door handle module is configured to exchange data with a vehicle-external communication unit and to control a security system of the vehicle, in particular as described above, wherein a housing is provided for the door handle module, in which an in particular closed, preferably sealed, receptacle is formed with an electronics unit for the controlling of the security system of the vehicle, wherein the electronics unit comprises at least one communication element for the exchange of data with the vehicle-external communication unit. The same advantages that have been described in conjunction with the door handle module according to the invention and/or the method for mounting a corresponding door handle module on a handle device, to which reference is fully made here, are achieved by means of the method for producing the door handle module for a handle device.

A method for producing a door handle module for a handle device can, in addition, as defined by the invention, comprise at least one of the following steps:
 a) Mounting the electronics unit on a second housing part of the housing,
 b) Inserting a first plug of a connection element through a connecting element on a second housing part of the housing, or
 c) Connecting, in particular soldering, a first plug of a connection element to the electronics unit.

A captive attachment of the electronics unit to the housing, in particular in the receptacle of the housing, can be enabled by step a). Step b) allows the provision of an electric connection and data connection to the electronics unit, which can be laid towards the inside of the vehicle all the way to the security system of the vehicle. A transmission-proof and persistent connection of the connection element to the electronics unit can be enabled step c).

Furthermore, it is conceivable that a method for producing a door handle module for a handle device comprises at least one further step:
 d) Fastening a first housing part of the housing on a second housing part of the housing, in order to provide the receptacle for the electronics unit.

A particularly flat door handle module can be provided by two housing parts, in which the electronics unit, e.g. in the form of a circuit board, can be accommodated. A flat door handle module can be adapted to the geometrical and aerodynamical properties of the handle device in a particularly elegant and safe manner, in order to reliably remain on the handle device despite airflow and to not generate any unpleasant noise.

Furthermore, it is possible in the scope of the invention that a method for producing a door handle module for a handle device comprises at least one further step:
 e) Filling the receptacle with a potting material to seal at least the electronics unit or a first plug of a connection element.

Thus, the electric and electronic components of the electronics unit can be sealed reliably from all sides.

Furthermore, the object of the invention is achieved by means of a method for providing a door handle module for a handle device of a moveable part of a vehicle, in particular a commercial vehicle, wherein the door handle module is configured to exchange data with a vehicle-external communication unit and to control a security system of the vehicle, in particular as described above, wherein the method includes at least one step of an above-described method for producing the door handle module and/or at least one step of an above-described method for mounting the door handle module to the handle device. The same advantages that have been described in conjunction with the door handle module according to the invention and/or the method for mounting and/or producing a corresponding door handle module on a handle device, to which reference is fully made here, are achieved by means of the method for producing the door handle module for the handle device.

BRIEF DESCRIPTION OF THE SEVERAL VIEWS OF THE DRAWINGS

Further measures, which improve the invention, result from the following description of exemplary embodiments of the invention, which are schematically shown in the Figures. All features and/or advantages of the claims, the description or the drawings, including construction details, physical arrangement and method steps, can per se or in any combination be essential to the invention. It is noted here that the Figures are only of descriptive nature and not meant to limit the invention in any form.

The Figures show in.

Identical reference characters will be used for the same technical features even in different exemplary embodiments throughout the Figures.

DESCRIPTION OF SPECIFIC EMBODIMENTS OF THE INVENTION

Figure 1:
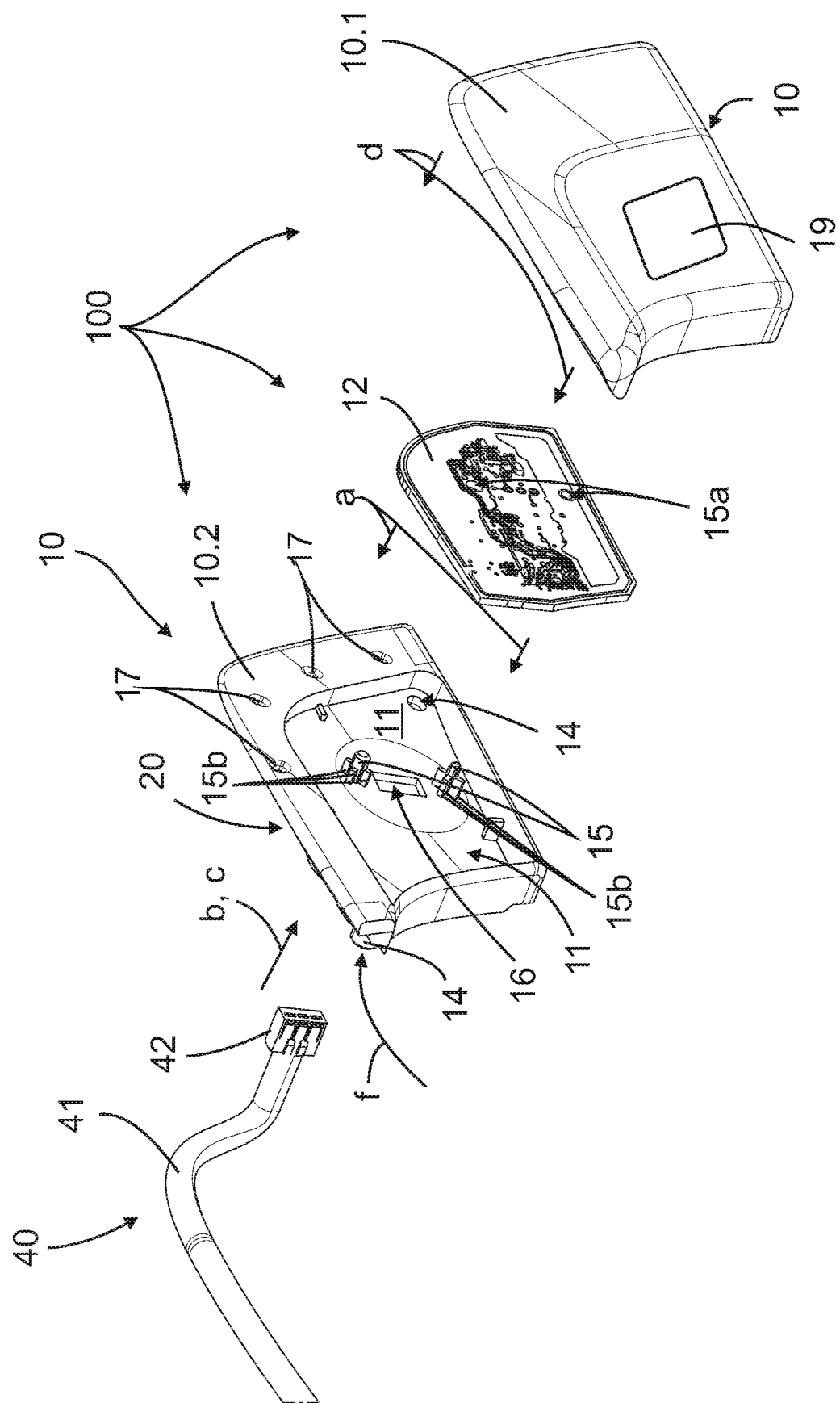
FIG. 1 a door handle module according to the invention in an exploded view,
 FIG. 2 a second housing part of a door handle module according to the invention,
 FIG. 3 a first housing part of a door handle module according to the invention,
 FIG. 4 a fastening adapter of a door handle module according to the invention,
 FIG. 5 a vehicle with a door handle module according to the invention,
 FIG. 6a a handle device with a module receptacle,
 FIG. 6b a handle device with a door handle module according to the invention,
 FIG. 7 a first housing part of the door handle module according to the invention with an inserted electronics unit,
 FIG. 8 assembling a first housing part and a second housing part of a door handle module according to the invention,
 FIG. 9 filling a receptacle between a first housing part and a second housing part of a door handle module according to the invention with a potting material,
 FIG. 10 a door handle module according to the invention in a fastened state on a handle device in a view from an internal side of the handle device,
 FIG. 11a a second plug of a connection element with a clip guidance,
 FIG. 11b a mounting clip for a clip guidance on a second plug of a connection element, and
 FIG. 12 a second plug of a connection element with a clip guidance engaged with a mounting clip.

FIG. 1 shows a door handle module 100 according to the invention prior to the assembly to form a module ready for employ on a handle device 202 of a movable part 201 of a vehicle 200, preferably a commercial vehicle, which is hereinafter schematically shown in FIG. 5. The door handle module 100 is characterized in that it includes a housing 10, in which an electronics unit 12 is completely received. The housing 10 can be formed e.g. of two parts with a first housing part 10.1 (see FIG. 3) and a second housing part 10.2 (see FIG. 2). A receptacle 11 is formed in the housing 10 to receive the electronics unit 12. However, it is likewise possible that the housing 10 is formed in one piece and comprises an opening, through which the electronics unit 12 can be inserted into the receptacle 11. The receptacle 11 can be relatively flat in order to accommodate the electronics unit 12 in the form of a circuit board therein (see FIGS. 1, 2 and 7). To that end, e.g. two receiving pins 15 can be provided in the internal side on the second housing part 10.2, which can engage into especially designed openings 15a on the circuit board of the electronics unit 12. The electronics unit 12 can be staked on the second housing part 10.2 by means of receiving pins 15, in order to arrange the electronics unit 12 in a captive manner on the housing 10, possibly via several spacers 15b on the receiving pins 15 (production step a) described based upon FIG. 7). The housing 10 according to the invention preferably forms a closed and sealed receptacle 11 for the electronics unit 12, in which the electronics unit 12 is reliably protected against weather influences and mechanical impacts. On an external side of the first housing part 10.1, an actuation section 19 can be provided, which can indicate the position of a wireless communication element 12b on the electronics unit 12, which is indicated in FIG. 6b. The wireless communication element 12b is to improve the functions of the handle device 202 to enable a wireless actuation of a security system 203 of the vehicle 200, to unlock e.g. a lock of the moveable part 201 in a keyless manner (see FIG. 5).

According to the invention, the electronics unit 12 serves to provide a wireless communication capability of a vehicle-external communication unit 50 and the handle device 202 of the moveable part 201 of the vehicle 200. The vehicle-external communication unit 50 can be formed e.g. in the form of an ID transponder, a smartphone or the like. The electronics unit 12 can receive data, e.g. identification data, from the vehicle-external communication unit 50 and forward it to the security system 203, e.g. in the form of an access control system. After a successful authorization of a user by the vehicle-external communication unit 50 at the vehicle-onboard security system 203, the electronics unit 12 can cause an actuation of a lock of the moveable part 201, e.g. via the security system 203 of the vehicle 200, to unlock the moveable part 201, whereby the moveable part 201 is unblocked for opening by means of the handle device 202. It is conceivable that a remote control of the security system 203 in the form of a keyless-go or keyless entry system is enabled by means of the door handle module 100 according to the invention. The comfort in operation of the security system 203 can be modernized thereby. In addition the security in operating the security system 203 can be improved by the door handle module 100 according to the invention.

In addition, the electronics unit 12 can serve for storing travel data, e.g. a driver's log, user profiles, or wear-related vehicle data, in order to extend the existing functions in the vehicle 200.

After that, a connection element 40 in the form of a cable 41 with a first plug 42, e.g. in the form of a Molex© plug, is guided through a connection aperture 16 in the second housing part 10.2 to the electronics unit 12 (production step b), which is explained based upon FIG. 7) and connected to the electronics unit 12, in particular soldered (production step c), which is explained based upon FIG. 7).

Figure 8:
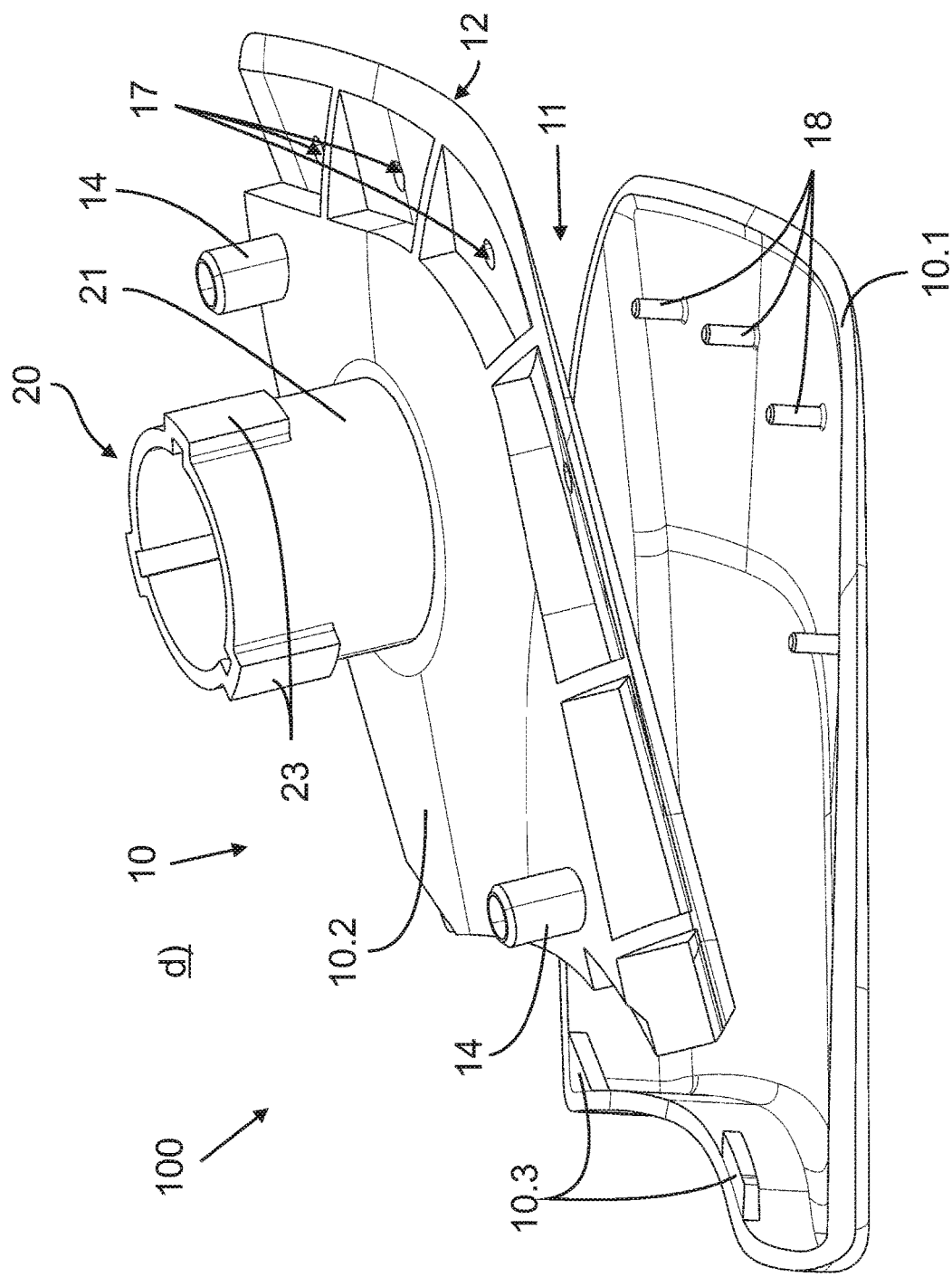

The two housing parts 10.1, 10.2 can be connected or staked at the second housing part 10.2 by means of connection openings 17, and connection pins 18 can be connected or e.g. staked to the first housing part 10.1, which is indicated in FIG. 8 (production step d), which is explained based upon FIG. 8. In addition, it is conceivable that the connection openings 17 and the connection pins 18 are formed as corresponding fastening elements, e.g. latch elements, in order to fasten the two housing parts 10.1, 10.2 together in a form-fit and/or force-fit manner. In addition, the housing parts 10.1, 10.2 can be bonded on a connection seam, e.g. on the side of the edge. Furthermore, the receptacle 11 in the housing 10 can be filled with a potting material (production step e), which is explained based upon FIG. 9, for what two filling spouts 14 can be provided on the rear side on the second housing part 10.2, which can also serve for the centering of the door handle module 100 to the handle device 202, as is explained in the view of FIG. 10.

Figure 4:
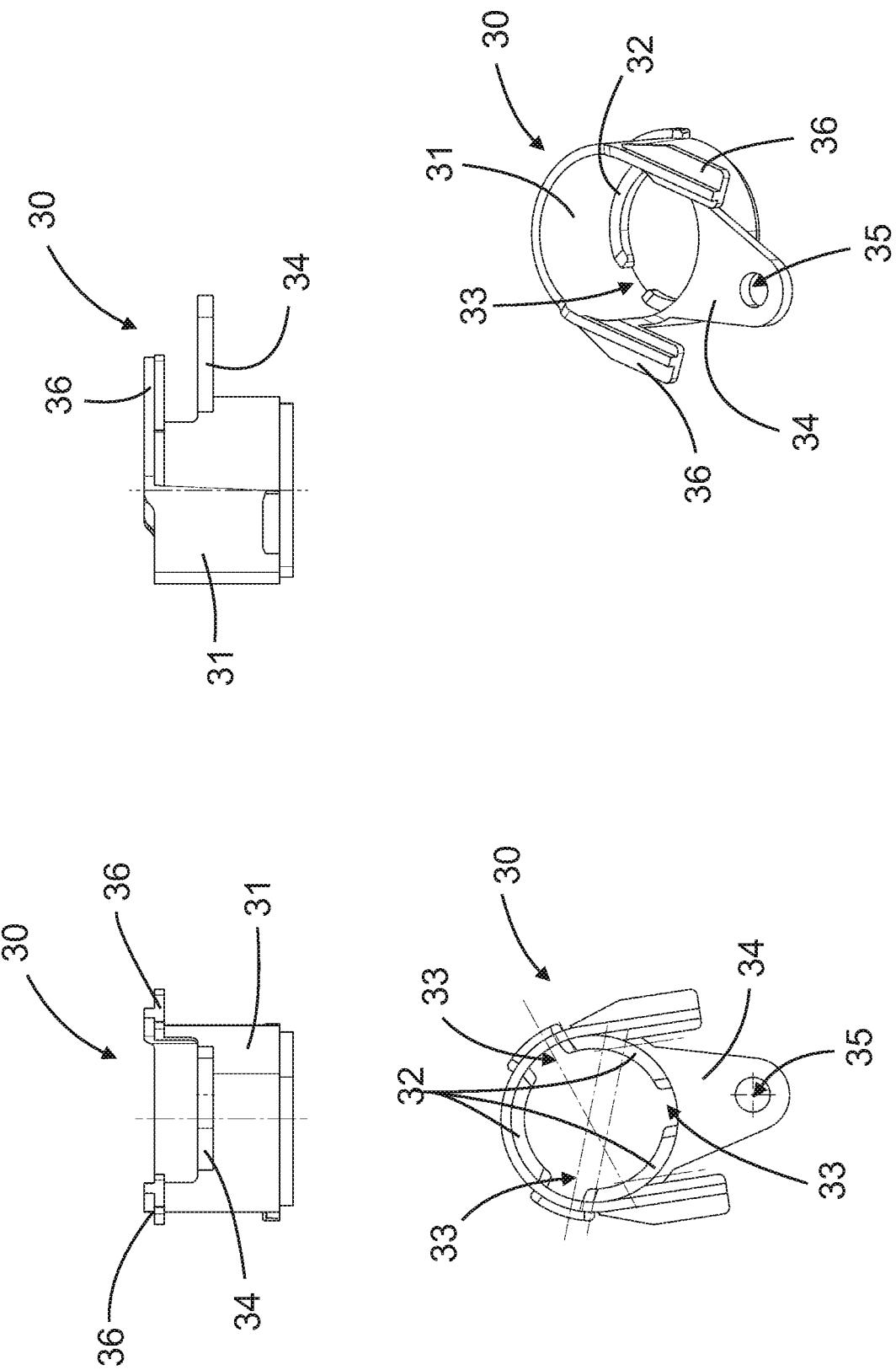
Figure 6A:
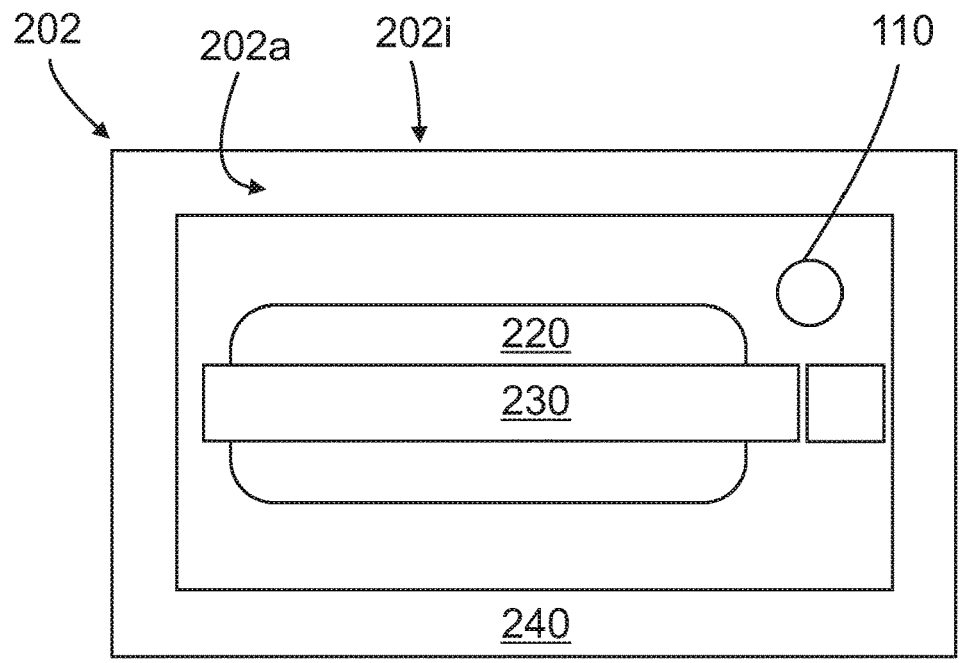

The assembled door handle module 100 is provided as a preferably fully closed-off and sealed retro-fit component in the production steps a) to e), which will be explained in greater detail in the following based upon FIGS. 7 to 10, which can be mounted on the handle device 202 in a simple, convenient manner without extensive mounting effort, which is shown in FIGS. 6a and 6b in an exemplary manner. The invention provides a relatively flat door handle module 100 in order to not interfere with the requirements in terms of design and aerodynamics on the handle device 202. The fastening of the door handle module 100 according to the invention on the handle device 202 serves as a fastening adapter 30, which is shown in FIGS. 4 and 10. The fastening adapter 30 can be inserted from inside the handle device 202 thereon, in order to fasten the door handle module 100 to the handle device 202, as is shown in the following in FIG. 10. To that end, a bayonet mount between the fastening adapter 30 and a connection element 20 can be created on a second housing part 10.2 of the door handle module 100. Here, the fastening adapter 30 and the connection element 20 can extend through a mounting receptacle 210, e.g. a locking cylinder receptacle, of the handle device 202, which is shown in FIG. 6a. The fastening adapter 30 can per se be screwed on the internal side to the handle device 202, as is shown in FIG. 10.

Figure 2:
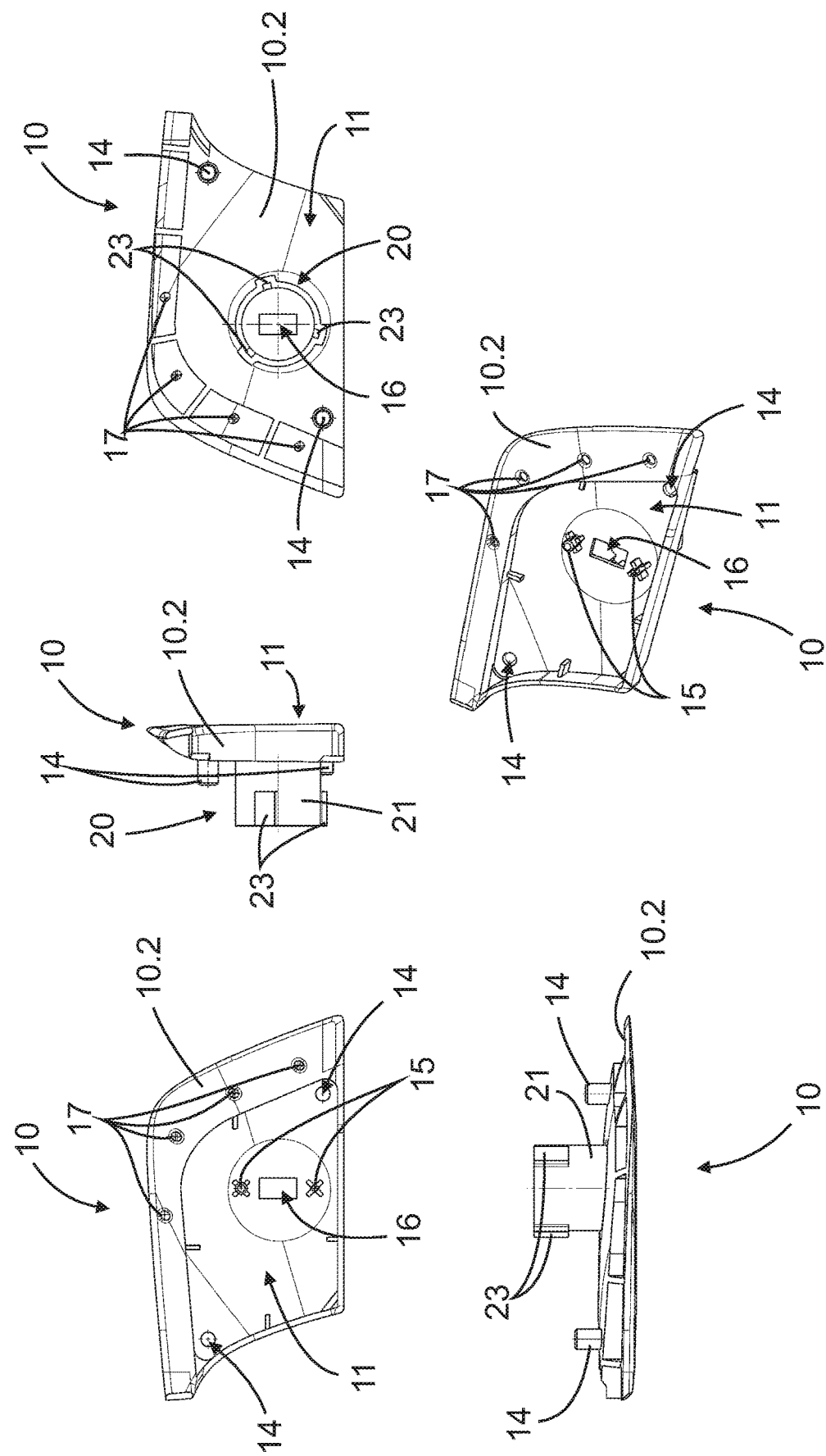

FIG. 2 shows the second housing part 10.2 alone from different views, i.e. from the top left to the bottom right first from an internal side, then from a narrow side, from an external side, from a wide side and in a perspective view. The second housing part 10.2 has an essentially flat shape with a likewise flat receptacle 11, in which the electronics unit 12 is received in the form of a circuit board with a placed-on sensor element 12a and a communication means 12b. For the fastening of the electronics unit 12 in the receptacle 11, receiving pins 15 are provided, which can be received in corresponding openings 15a on the circuit board of the electronics unit 12 (production step a), which is shown in FIG. 7). The outer tips of the receiving pins 15 can serve for the staking of the electronics unit 12 on the second housing part 10.2, whereby the electronics unit 12 is attached on the second housing part 10.2 in a captive manner. The lower bases of the receiving pins 15 can comprise rib-type protruding spacer elements 15b, in order to position the electronics unit 12 at a predefined distance to the internal side of the second housing part 10.2. This distance can be used for molding or casting around the electronics unit 12 in production step e), which is explained based upon FIG. 9. In addition, the spacer elements 15b ensure more stability of the finished door handle module 100.

In addition, the second housing part 10.2 comprises a connection aperture 16 for the connection element 40, which is formed complementary to the first plug 42 of the connection element 40, in order to receive the first plug 42, preferably in a clearance-free manner.

Figure 9:
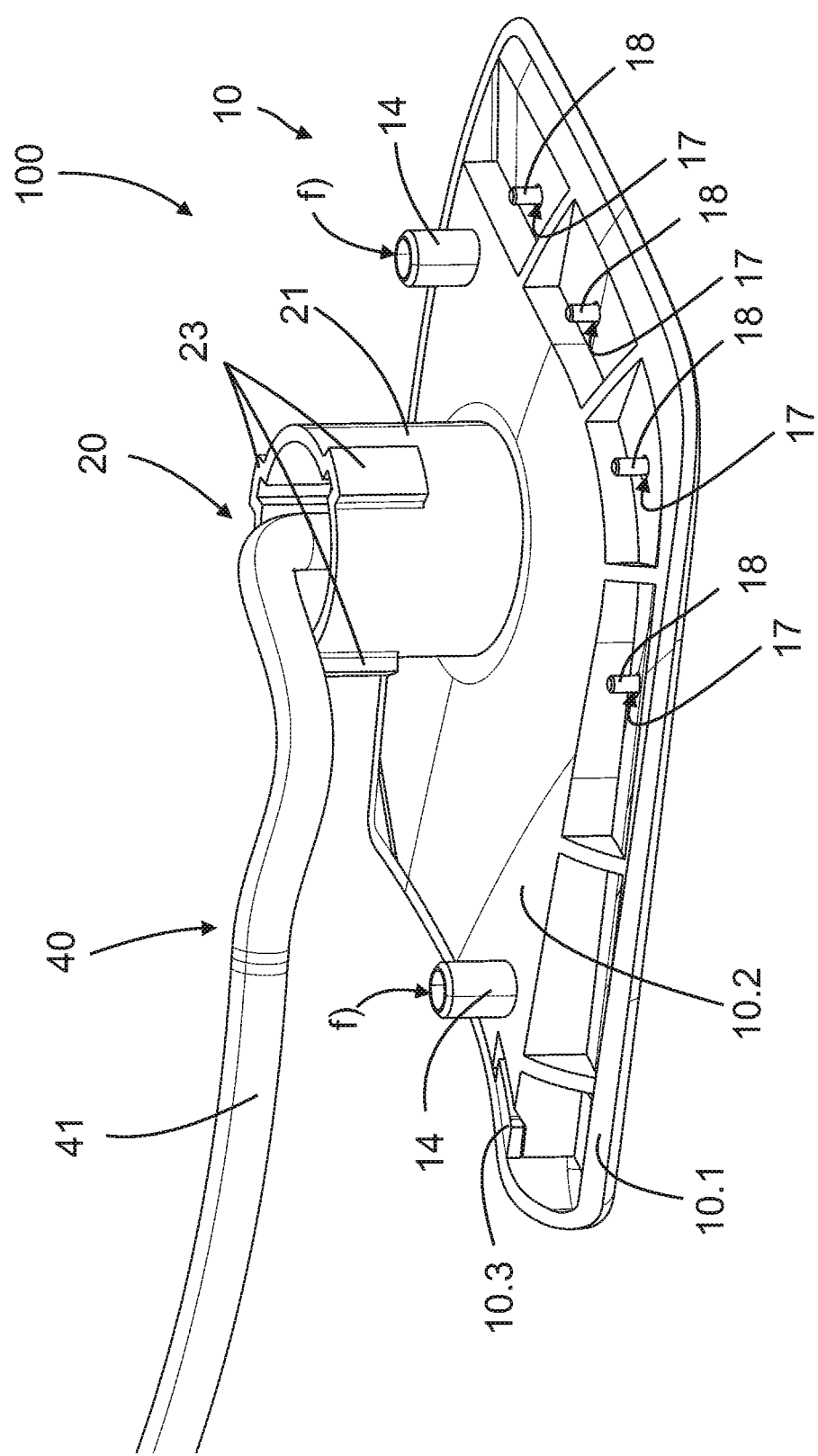
Figure 10:
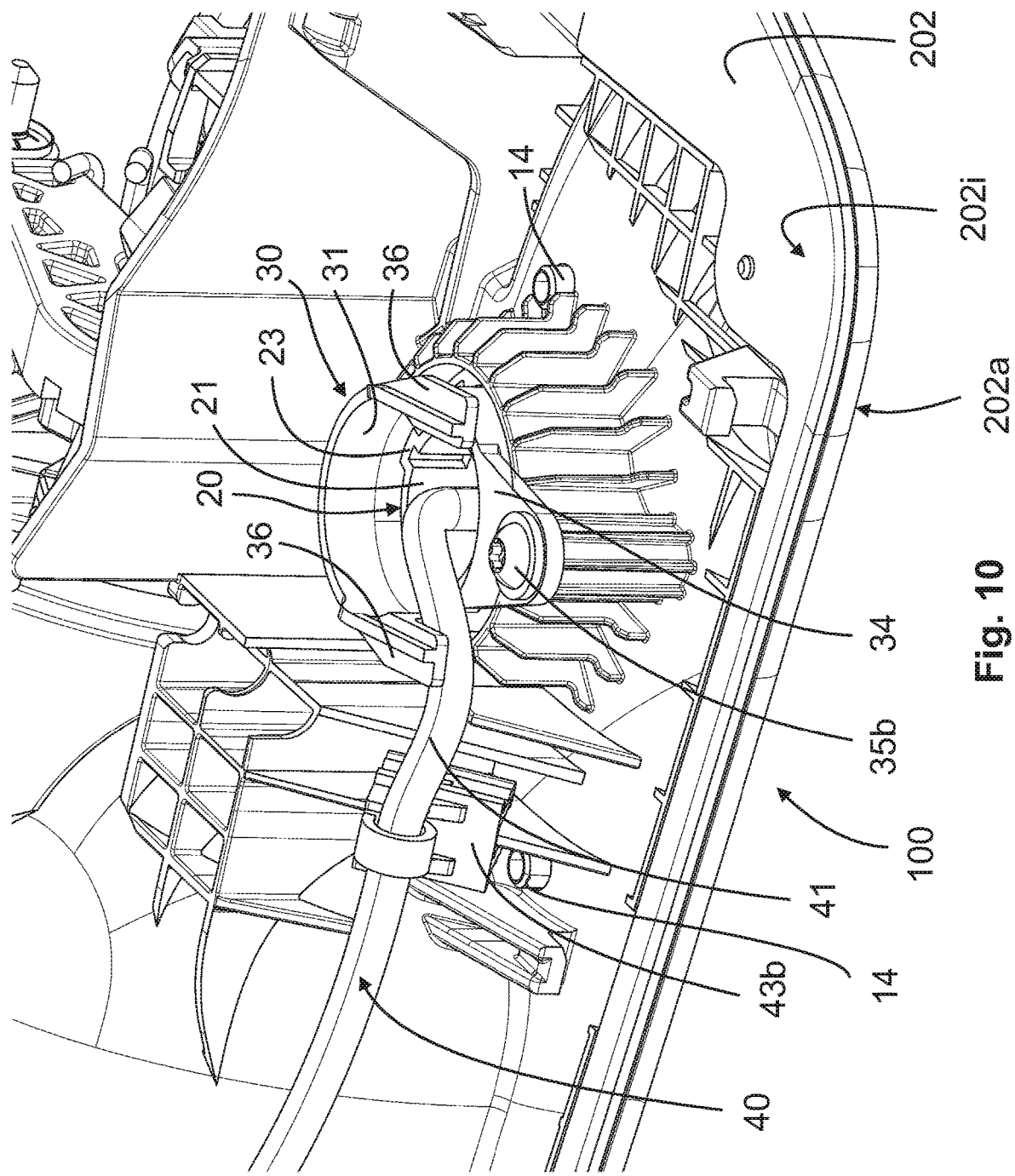

Furthermore, for example two filling spouts 14 protruding outward are provided on the second housing part 10.2, which can on the one side serve for positioning or fixing the door handle module 100 on the handle device 202 (see FIG. 10) and on the other side for filling the receptacle 11 with the potting material (see production step e) in FIG. 9).

Furthermore, the second housing part 10.2 comprises multiple connection openings 17 on a peripheral section, which can serve for the connection to the connection pins 18 of the first housing part 10.1, which is shown alone in FIG. 3. A peripheral arrangement of the connection openings 17 can serve to correctly position the two housing parts 10.1, 10.2 relative to one another during the production of the door handle module 100.

On the external side, the second housing part 10.2 is formed with a connection element 20, which can be cast monolithically and/or of the same material as the second housing part 102, e.g. be cast in one piece.

The connection element 20 has an essentially cylindrical guiding body 21, which can be received coaxially to and inside a cylindrical guiding section 31 of the fastening adapter 30 in the mounting of the door handle module 100 on the handle device 202, as is shown in FIG. 10. The fastening adapter 30 is shown in a unique position in FIG. 4.

Radially protruding from the cylindrical guiding body 21 of the connection element 20, cam or protrusion-type positioning means 23 are formed. The positioning means 23 can engage into groove-shaped receiving means 33 on the annular receiving element 32 inside the cylindrical guidance section 31 of the fastening adapter 30, when the connection element 20 is correctly oriented to the fastening adapter 30, in order to perform a plug movement of the fastening adapter 30. Slid-onto the cylindrical guiding body 21 of the connection element 20, the fastening adapter 30 can be turned to prevent a disengagement of the plug connection to the connection element 20. The cam- or protrusion-shaped positioning means 23 leave the groove-shaped receiving means 33 after the insertion of the fastening adapter 30 onto the connection element 20, and are displaced on the annular receiving element 32 after the turning of the fastening adapter 30 relative to the connection element 20. Thus, a form and/or force-fit connection in the type of a plug-rotation connection or a bayonet mount/connection is formed between the fastening adapter 30 and the connection element 20.

FIG. 3 shows the first housing part 10.1 in multiple views, which closes the receptacle 11 and is arranged on the handle device 202 to be visible to the outside. As mentioned above, the first housing part 10.1 comprises multiple laterally-arranged connection pins 18 for the connection to the connection openings 17 on the second housing part 10.2. In addition, the first housing part 10.1 comprises e.g. two laterally-arranged undercuts 10.3, below which the second housing part 10.2 can be inserted first, in order to subsequently be lowered to the connection pins 18, as indicated in FIG. 8. Thus, in production step d), a plug-pivot-movement of the two housing parts 10.1, 10.2 relative to one another can be performed in order to close the receptacle 11. This movement is provided by the undercuts 10.3 and the connection pins 18, so that the assembly of the door handle module 100 can be performed in a simple and even intuitive manner.

An actuation section 19 can be depicted externally on the first housing part 10.1, in order to indicate the position of the wireless communication means 12b on the electronics unit 12, which is shown in FIG. 6b.

FIG. 4 shows the fastening adapter 30 in multiple views. The fastening adapter 30 has a fastening arm 34, radially protruding from the cylindrical guiding section 31, with a fastening means 35 in the form of an opening for a screw 35a, in order to screw the fastening adapter 30 to an inner side 202i of the handle device 202 (see FIG. 10). A screwing of the fastening adapter 30 can be effected once the fastening adapter 30 has been inserted between the opening of the mounting receptacle 210 on the handle device 202 and the external side of the connection element and has been rotated in such a way that the fastening adapter 30 cannot be pulled-out anymore. Thus, a reliable fastening of the finished and closed housing 10 of the door handle module 100 on the handle device 202 can be enabled. In addition, the fastening adapter 30 can comprise at least one strain-relief element 36 to wind the cable 41 of the connection element 40 thereon and take-up the tensile forces, as indicated by FIG. 10.

Figure 5:
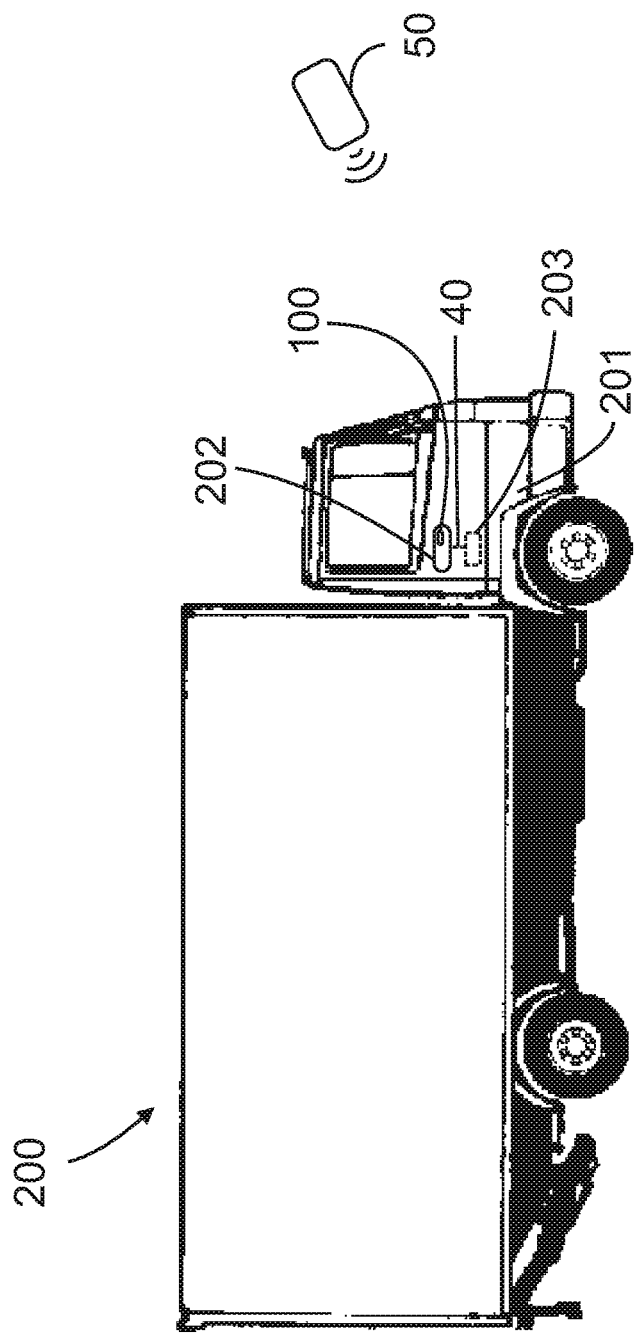
Figure 6B:
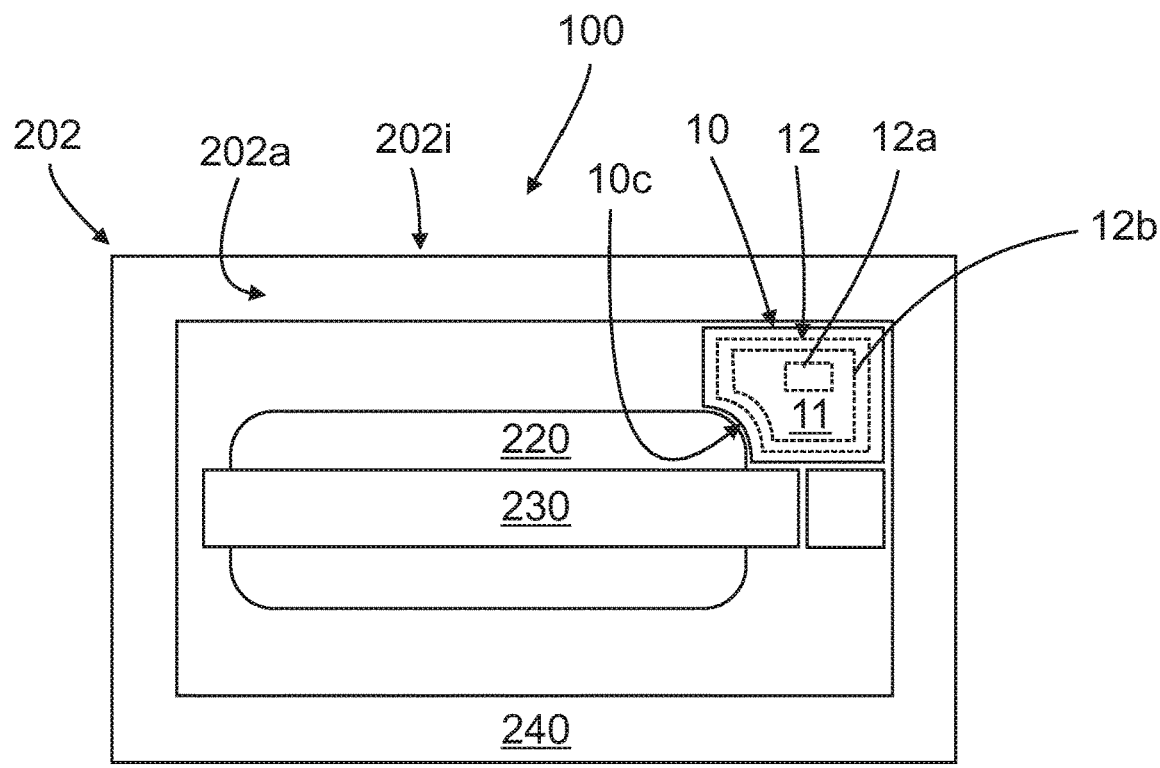

FIG. 5 shows a commercial vehicle as an example of a vehicle 200 which can be retrofitted with the door handle module 100 according to the invention. In particular in older models of the vehicles 200, which do not have a remote access, the door handle module 100 according to the invention can be advantageous to enable a keyless actuation of the security system 203 of the vehicle 200 by means of the external communication unit 50, in order to be able to unlock the moveable part 201, e.g. in the form of a door, via remote access.

FIGS. 6a and 6b show an exemplary handle device 202 with an external side 202a, on which the housing 10 of the door handle module 100 according to the invention can be fastened. The handle device 202 can comprise a handle recess 220 with a handle 330 arranged there, which is formed on an external recess 240 of the handle device 202. According to the invention, the handle 330 can be a rigid or moveable handle 330. Furthermore, the handle device 202 comprises a module receptacle 210 in the form of a locking cylinder receptacle, in which the door handle module 100 according to the invention is arranged. The module receptacle 210 is shown schematically below the external recess 240 and above the handle 230 and the handle recess 220. The door handle module 100 has a cut-out 10c in the region of the handle recess 220, in order to adjust the door handle module 100 to the outer contour of the handle recess 220 of the handle 230. The door handle module 100 closes the module receptacle 210 completely and extends essentially flush to the external recess 240 of the handle device 202. The housing 10 of the door handle module 100 can be colored or solid-colored in such a way that there is no difference in color to the external recess 240 of the handle 230 and the door handle recess 220.

Inside the housing 10 of the door handle module 100, the electronics unit 12 is arranged. The electronics unit 12 can comprise a sensor element 12a as a communication element 12a, which can be formed as a proximity sensor, e.g. as a capacitive sensor. The sensor element 12a can serve to detect an approach of a user to the door handle module 100, in order to waken the electronics unit 12 for a data communication with the vehicle-external communication unit 50, which is shown in FIG. 5 in an exemplary manner. In addition, the electronics unit 12 can comprise a wireless communication element 12b, which can be formed as an NFC communication element, in order to ensure a communication of the security system 203 of the vehicle 200 and the vehicle-external communication unit 50, which can be carried by a user.

FIGS. 7 to 9 serve to explain the steps a) to e) according to the invention for producing a door handle module 100, which can be configured as described above.

As shown in FIG. 7, first, the following steps can be provided for producing the door handle module 100:
a) Mounting the electronics unit 12 on the second housing part 10.2 of the housing 10,
b) Inserting the first plug 42 of the connection element 40 through the connection element 20 on the second housing part 10.2 of the housing 10,
c) Connecting, in particular soldering, the first plug 42 of the connection element 40 to the electronics unit 12.

Contacts 44 are provided for soldering the first plug 42 to the electronics unit 12. When the electronics unit 12 is fastened in the receptacle 11 and connected to the first plug 42 of the connection element 40, there is enough space around the electronics unit 12 to be cast around with a potting material through the filling spouts 14. By filling the receptacle 11 with a potting material, the connection points between the first plug 42 and the contacts 44 on the electronics unit 12 can be shielded-off and sealed.

FIG. 8 shows a further step for producing the door handle module 100:
d) fastening the first housing part 10.1 of the housing 10 to the second housing part 10.2 of the housing 10, in order to provide the receptacle 11 for the electronics unit 12.

Here, the second housing part 10.2 can first be inserted under the undercuts 10.3 on the first housing part 10.1 and then be lowered to the connection pins 18. Thus, the two housing parts 10.1, 10.2 can perform a plug-pivot-motion relative to one another in order to close the receptacle 11. The arrangement of the undercuts 10.3 and the connection pins 18 indicates a certain arrangement of the two housing parts 10.1, 10.2 to one another, in which they can be fastened to one another. Possible mounting errors can be prevented thereby.

FIG. 9 indicates a further step for producing the door handle module 100:
e) Filling the receptacle 11 with a potting material to seal at least the electronics unit 12 or a first plug 42 of a connection element 40.

FIG. 10 shows the door handle module 100 according to the invention in a mounted state on the handle device 202 in the view onto an internal side 202i of the handle device 202. The essential factor in the mounting of the door handle module 100 according to the invention is that the housing 10 of the door handle module 100 is fixed on the outer side 202a of the handle device 202 (see filling spout 14, which project through corresponding openings of the handle device 202) and are fastened by the fastening adapter 30 from the internal side 202i of the handle device 202 to the handle device 202. In a mounted state of the door handle module 100 on the handle device 202, the module receptacle 210, the connection element 20 and the fastening adapter 30 extend coaxially with one another. After the connection of the fastening adapter 30 to the connection element 20, the housing 10 of the door handle module 100 will be abutting from the outer side 202a of the handle 202, and the fastening arm 34 of the fastening adapter 30 will be abutting from the internal side 202i of the handle device 202. The door handle module 100 is mounted on the handle device 202 in a reliable and captive manner thereby.

Figure 11A:
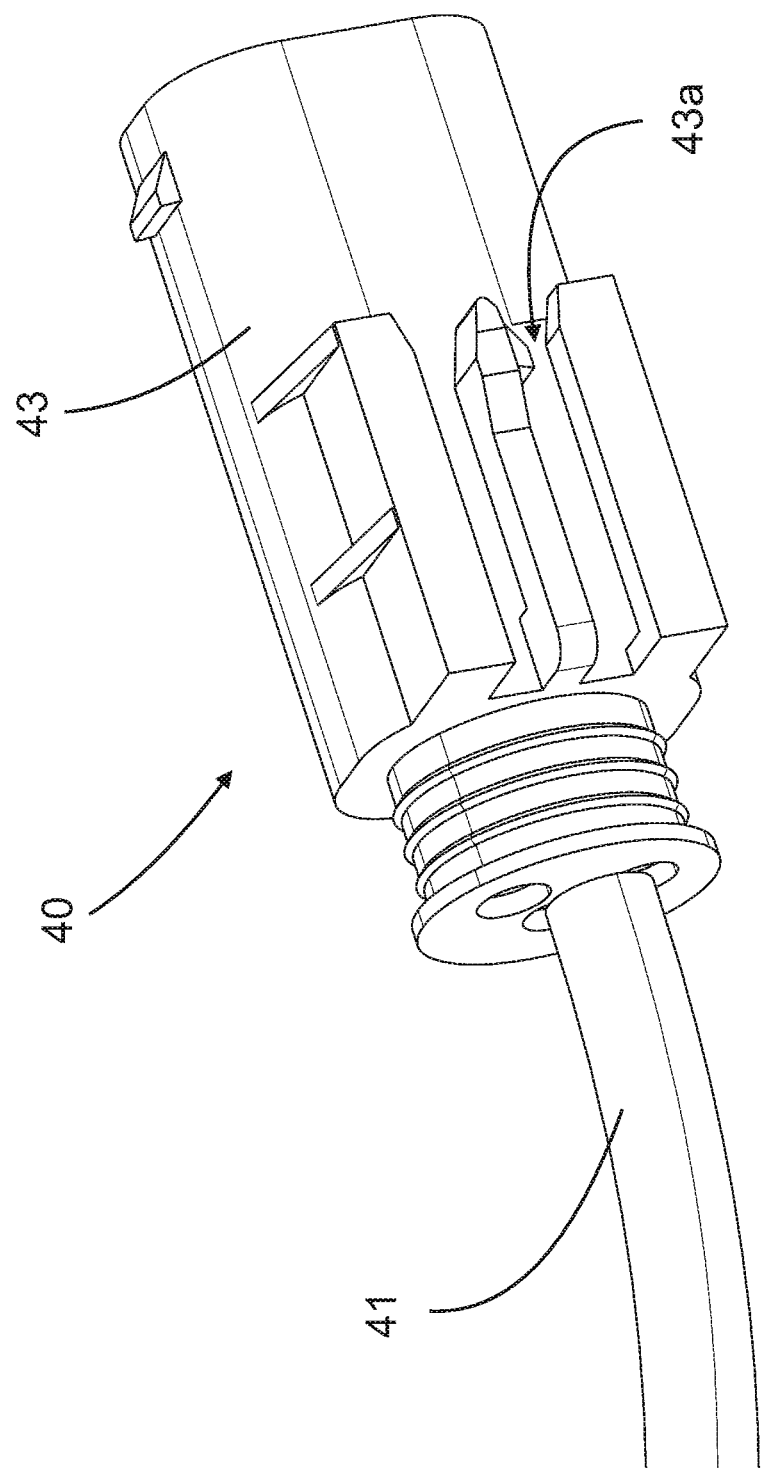
Figure 11B:
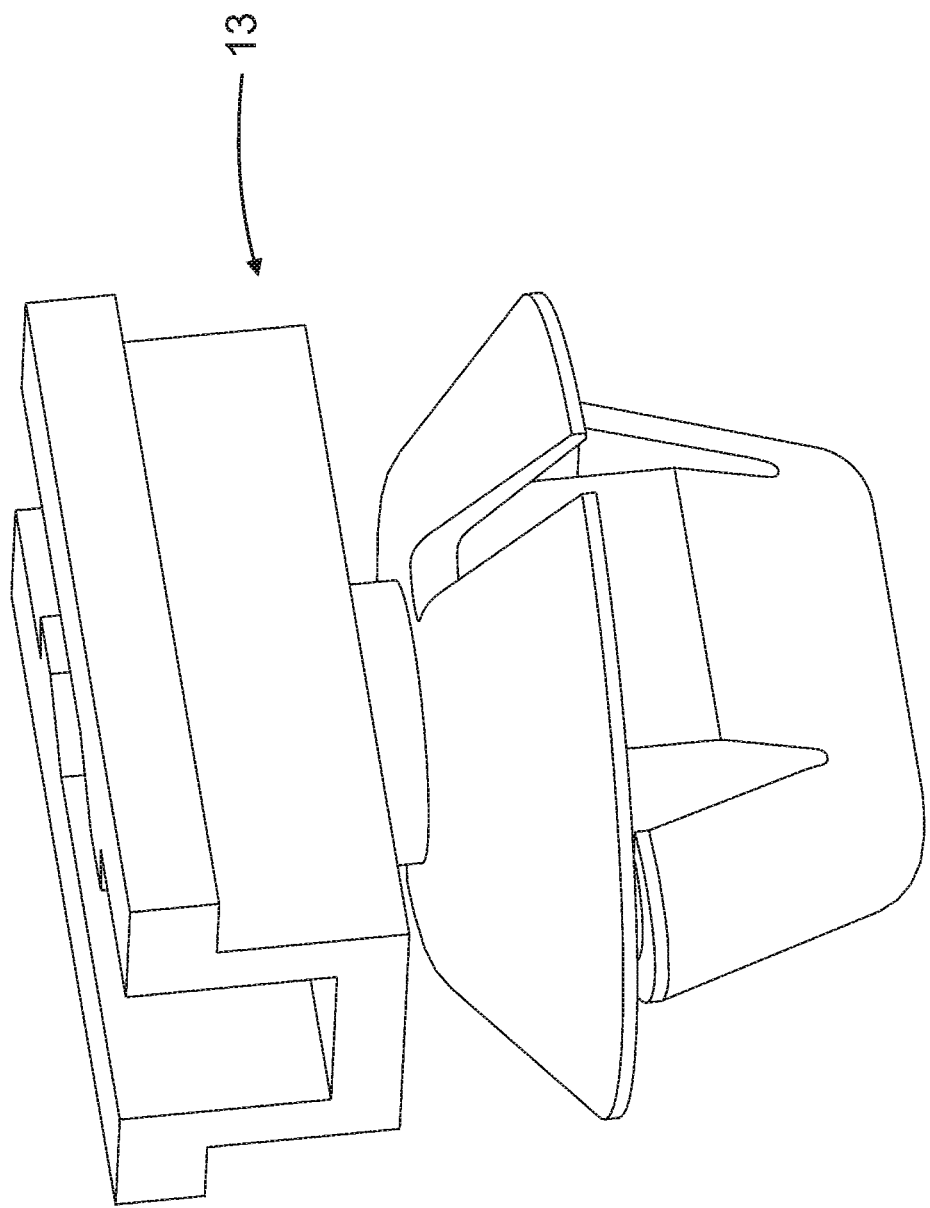
Figure 12:
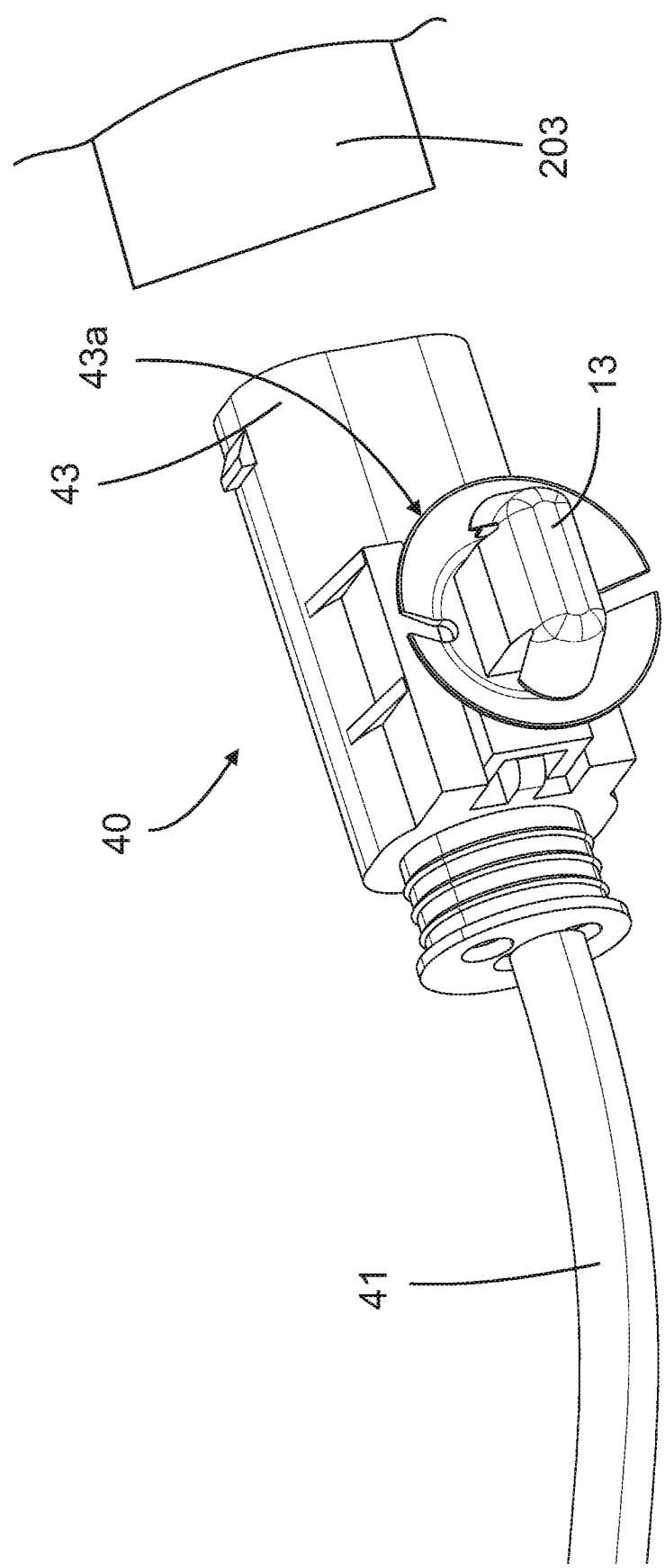

FIG. 11 shows a connection element 40 with a second plug 43 on an end of the connection element 40 at the security system side. The second plug 43 may comprise a clip guidance 43a to fix the connection element 40 on the vehicle 200, preferably near the security system 203. FIG. 11b shows a mounting clip 13 formed complementary to the clip guidance 43a, which can be provided in a set with the door handle module 100 according to the invention. FIG. 12 shows a clip guidance 43a engaged with the mounting clip 13.

In addition, one or multiple guiding clips 43b can be provided along the length of the cable 41 of the connection element 40, wherein an exemplary guiding clip 43b is shown in FIG. 10. Together with the second plug 43, the mounting clip 13 and the guiding clip 43b, a complete construction set can be provided, by means of which the door handle module 10 can be fastened to the handle device 202 and the connection element 40 can be installed on the vehicle in a simple and convenient manner and be guided all the way to the security system 203.

The above description of embodiments describes the present invention exclusively by way of examples. Individual features of the embodiments, as long as technically reasonable, can naturally be combined with one another in any manner without departing from the scope of the present invention.

LIST OF REFERENCE CHARACTERS

100 Door handle module
10 Housing
10.1 First housing part
10.2 Second housing part
10.3 Undercut
10c Recess
11 Receptacle
12 Electronics unit
12a Sensor element
12b Wireless communication element
13 Mounting clip
14 Filling spout
15 reception pin
15a Opening for reception pin
15b Spacer element
16 Connection aperture
17 Connection opening
18 Connection pin
19 Actuation section
20 Connection element
21 Guiding body
23 Positioning means
30 Fastening adapter
31 Guiding section
32 Receiving element
33 Receiving means
34 Fastening arm
35 Fastening means
35a Screw
36 Strain-relief element
40 Connection element
41 Cable
42 First plug
43 Second plug
43a Clip guidance
43b Guiding clip 44 Contacts
50 Communication unit
200 Vehicle
201 Moveable part
202 Handle device
202a External side
202i Internal side
203 Security system
210 Module receptacle
220 Handle recess
230 Handle
240 External recess

What is claimed is:

1. A door handle module for enabling remote controlling of an existing security system locking and unlocking a moveable part of a vehicle, comprising:
a housing, in which a receptacle is formed, in which an electronics unit for controlling the existing security system of the vehicle is arranged,
wherein the electronics unit comprises at least one communication element for the exchange of data with a vehicle-external communication unit, and
a separate fastening adapter for insertion from an internal side of a handle device of the movable part of the vehicle, and
a connection element formed on the housing for insertion from an external side of the handle device,
wherein the door handle module is fastened with the separate fastening adapter to the handle device via the connection element.

2. The door handle module according to claim 1, wherein at least the electronics unit comprises at least one communication element in the form of a member of a group consisting of: a sensor element to waken the electronics unit and a wireless communication element adapted to ensure a communication of the existing security system of the vehicle and the vehicle-external communication unit.

3. The door handle module according to claim 1, wherein the housing is formed in one or more pieces with a first housing part which serves at least for covering the receptacle or for a visual arrangement on the handle device, and with a second housing part which serves at least for fastening the electronics unit or for establishing a connection of the connection element to the fastening adapter.

4. The door handle module according to claim 1, wherein the housing, comprises at least two receiving pins to fasten the electronics unit to the housing by staking.

5. The door handle module according to claim 1, wherein the housing comprises a connection opening for a cable.

6. The door handle module according to claim 1, wherein the housing, comprises at least two filling spouts adapted to fill at least the receptacle with a potting material or to position the housing on an external side of the handle device.

7. The door handle module according to claim 1, wherein the housing comprises multiple connection openings adapted to cooperate with connection pins on a first housing part of the housing in order to fasten the first housing part to a second housing part of the housing.

8. The door handle module according to claim 1, wherein the housing comprises an actuation portion, in order to point out to the at least one communication element of the electronics unit.

9. The door handle module according to claim 1, wherein the housing comprises multiple undercuts adapted to position a first housing part of the housing on a second housing part of the housing.

10. The door handle module according to claim 1, further comprising a cable with a first plug for connection to the electronics unit, and a second plug for connection to the existing security system of the vehicle.

11. The door handle module according to claim 1, further comprising a clip guidance for at least one of fixing a cable on a complementary mounting clip of the vehicle and positioning the cable on the vehicle.

12. The door handle module according to claim 1, wherein the fastening adapter has an at least sectionally cylindrical guidance section, which can be received in a lock cylinder receptacle of the handle device, wherein the fastening adapter is formed geometrically complementary to the lock cylinder receptacle of the handle device.

13. The door handle module according to claim 1, wherein the fastening adapter comprises essentially annular receptacle element, which is formed in such a way to enable a connection of the housing-side connection element to the fastening adapter in only one predetermined orientation of the connection element relative to the fastening adapter.

14. The door handle module according to claim 1, wherein the fastening adapter comprises at least one groove-shaped element for a cam-shaped positioning element on the housing-side connection element.

15. The door handle element according to claim 1, wherein at least the fastening adapter comprises at least one of:
at least one fastening arm, in order to fasten the fastening adapter to the handle device (202) at least in a form-fit or force-fit manner,
a fastening element in the form of a receiving opening for a screw or in the form of a latch element for a complementary counter-latch element of the handle device.

16. The door handle module according to claim 1, wherein the fastening adapter comprises at least one strain-relief element for a cable.

17. The door handle module according to claim 1, wherein the housing-side connection element comprises a guiding body adapted to be received in the fastening adapter or is formed geometrically complementary to the fastening adapter.

18. The door handle module according to claim 1, wherein the housing-side connection element comprises at least one cam-shaped positioning element adapted to be brought into mechanical engagement with a receiving element, in order to enable the connection of the connection element to the fastening adapter in only one predetermined orientation of the connection element relative to the fastening adapter.

19. The door handle module according to claim 1, wherein the at least one communication element is adapted for wireless exchange of data with a vehicle-external communication unit and wherein the electronics unit controls the security system to lock or unlock the moveable part based on the wireless exchange of data with the vehicle-external communication unit.

20. The door handle module according to claim 1, wherein the existing security system does not have a wireless communication capability.

* * * * *